June 13, 1972    A. NOVA ET AL    3,669,590

APPARATUS FOR MAKING SHOES

Filed March 30, 1970    2 Sheets-Sheet 1

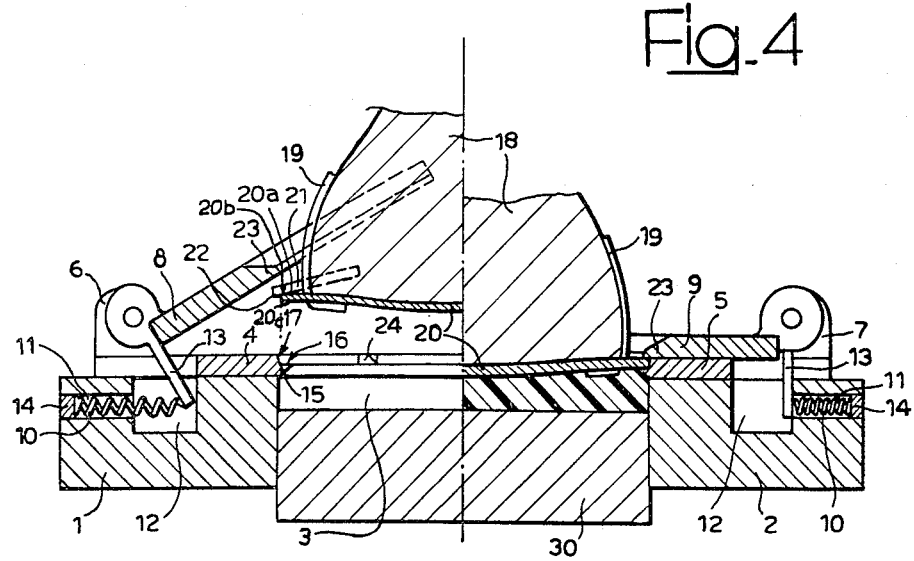
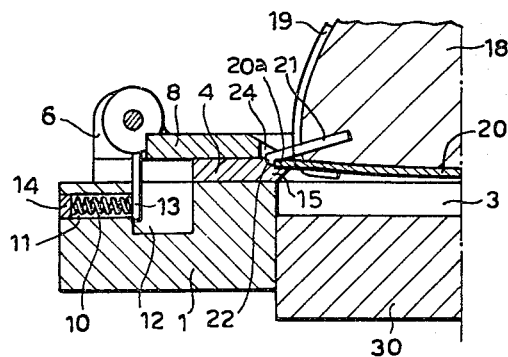
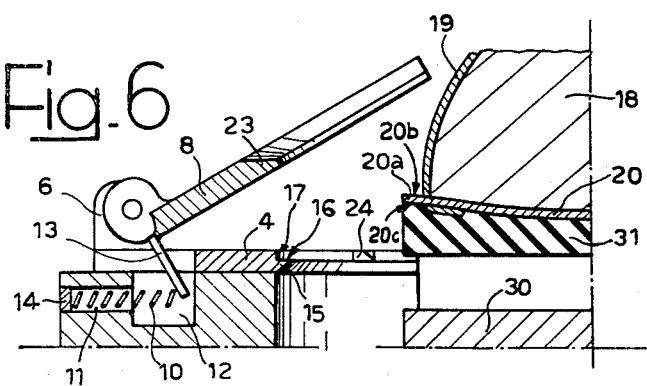

3,669,590
APPARATUS FOR MAKING SHOES
Antonio Nova, Oscar Nova, and Renzo Nova, Legnano, Milan, Italy, assignors to Officine Meccaniche Antonio Nova, Legnano, Milan, Italy
Filed Mar. 30, 1970, Ser. No. 23,658
Claims priority, application Italy, Apr. 11, 1969, 51,395/69
Int. Cl. B29f 1/12
U.S. Cl. 425—119                               1 Claim

ABSTRACT OF THE DISCLOSURE

The apparatus is provided with a molding chamber having sidewalls with a ledge formed thereon about the periphery of the chamber. A last having the upper portion of the shoe including an insole with a projecting edge is placed over the chamber such that the projecting edge of the insole rests on the ledge. Hooked pins are provided on the last for holding the insole in proper position prior to placement on the ledge. When the insole is resting on the ledge, a pair of plates are pivoted into engagement with the upper surface of the projecting edge to clamp the insole over the molding chamber. The edges of the clamping plate are provided with notches to provide clearance for the hooked pins so that the pins will not interfere with the clamping operation.

---

The present invention relates to shoe making and particularly to an improved method and apparatus for making shoes with moulded soles having projecting edges. Processes for the manufacture of shoes having moulded soles, obtained by the vulcanization of raw rubber or by the injection of plastics material into a mould, are well known. In previously known processes a projecting edge portion formed by a suitable strip of material sewn or otherwise attached to the edge of a vamp, or formed by the edge of the vamp suitably folded outwards has been used to ensure that the mould is sealed against escape of the material of which the sole is to be made. For this reason the larger than that required to cover the upper face of the projecting edge portion has been prepared in a size sole, so that it projects laterally out from the region where the sole itself joins the vamp and the insole of the shoe.

The part of the projecting edge portion which projects out from the shoe is pressed, during the moulding of the sole, between the upper face of a part of the mould and a frame which can be closed onto the upper face of the said part of the mould. Such a frame is provided with an internal lip which extends close to the vamp so as to prevent the projecting edge from changing shape under the pressure inside the mould during the moulding of the sole.

This process is inconvenient since when the shoe, otherwise complete, is taken from the mould, it requires a finishing operation which consists of trimming off the excess of the projecting edge portion so that it no longer projects out from the edge of the sole.

During this finishing operation it frequently happens that the side wall of the moulded sole remains stuck and leaves on it traces which are not only unaesthetic, but can even spoil to a certain extent the use of the finished shoe, especially in the case where the moulded sole of the shoe is made of a mixture producing a spongy rubber.

An object of the present invention is to provide a process for the manufacture of shoes provided with moulded soles and with projecting edge portions in which a finishing operation after the shoes have left the mould is not required.

According to one aspect of the present invention a method of manufacturing a shoe having a moulded sole with a projecting edge comprises the steps of: forming an upper and an insole of the size which they are to be in the finished shoe the edge portion of at least one of which is to form at least part of the said projecting edge of the sole, securing the upper and the insole to a last, positioning the last over a moulding chamber of a mould to close the moulding chamber such that the projecting edge portion rests on a ledge on the side wall of the moulding chamber, clamping the projecting edge portion between the ledge and a clamping member, and moulding a sole to the upper and insole on the last.

According to another aspect of the invention apparatus for manufacturing shoes having moulded soles with projecting edges comprises a mould having a moulding chamber, a last for receiving and supporting an upper and an insole the edge portion of at least one of which is to form, at least in part, the projecting edge of the sole of the shoe to be manufactured, the moulding chamber being closable by the superimposition thereon of the last with the upper and insole mounted on it, the side walls of the moulding chamber being provided with a ledge for supporting the said edge portion, and a clamping member comprising an openable frame for clamping the said edge portion to the ledge during moulding of the sole.

The invention will now be described, by way of example, with reference to the accompanying drawings, in which:

FIG. 4 is two partial transverse sections on an enlarged scale, which show, on the left, the mould in a partly open position before the injection of the sole in a fluid state and, on the right, the same mould after the injection of the sole in a fluid state;

FIG. 5 is a cross section, on an enlarged scale, on the line 5—5 of FIG. 3, and

FIG. 6 is a partial transverse section which shows the mould in a completely open position with a completed shoe ready for removal from the mould.

Figure 1:
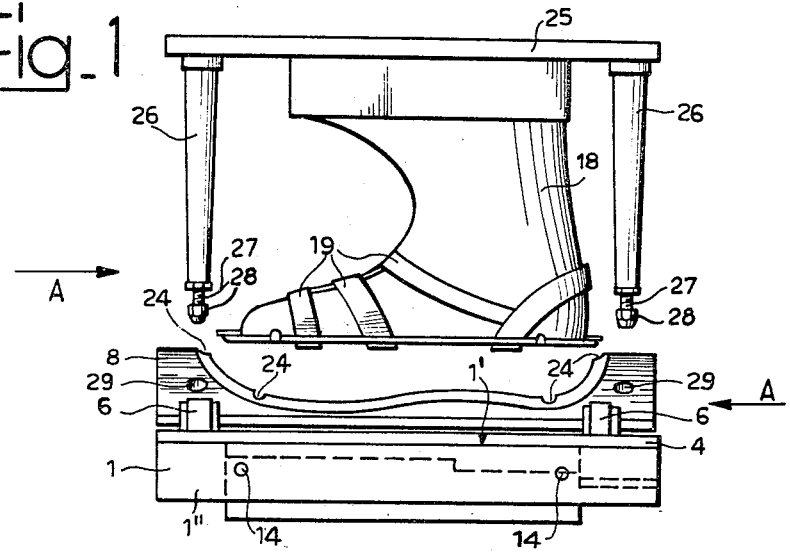
FIG. 1 is a side view of a mould according to the invention, shown in a partly open position.
Figure 2:
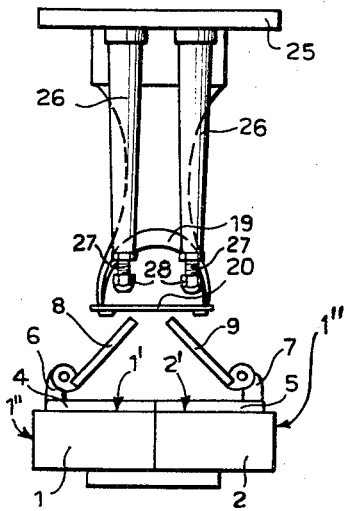
FIG. 2 is a view of the mould in the direction of the arrow A of FIG. 1.
Figure 3:
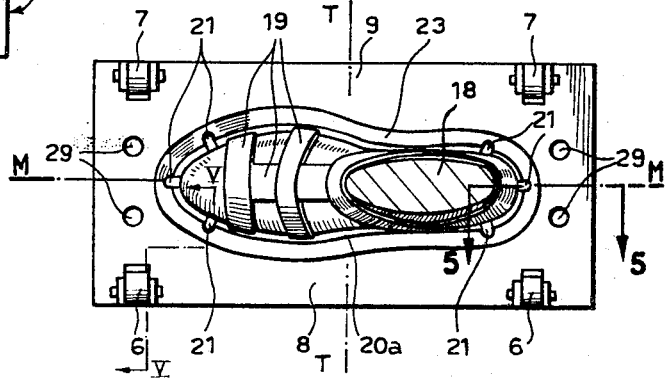
FIG. 3 is a plan view, partially in section, of the mould of FIG. 1 shown in a closed position.

The apparatus shown in the drawings comprises a mould formed by two parts 1 and 2, which fit closely together, when the mould is closed, along a line M—M shown in FIG. 3 to define the side walls of the mould. The parts 1 and 2 of the mould an be separated from one another to allow a sole of a shoe formed within the chamber 3 of the mould, see FIG. 4, to be removed. On the upper faces, 1' and 2' respectively, of the parts 1 and 2 of the mould are plates 4 and 5. Each of the plates 4 and 5 carries two upwardly projecting mounting members, 6 and 7 respectively, in which two half-frames 8 and 9 respectively are hinged. Each half-frame 8, and 9 has transverse levers 13 secured near its respective hinges 6, 7. The levers 13 extend into respective recesses 12 in the parts 1 and 2 of the mould. Apertures 11 are formed from the sides of the parts 1, 2 of the mould and extend into the recesses 12 from the side walls thereof. Springs 10 within the apertures 11 bias the levers 13 so that each half-frame 8 and 9 is normally kept in a raised position by the action of the springs 10, one of which is illustrated on the left side of FIG. 4. A plug 14 is screwed into the end of each aperture 11 and is adjustable to adjust the pressure which the springs 10 exert on the levers 13.

The plates 4 and 5 which are attached to the parts 1 and 2 of the mould respectively each have an inwardly projecting lip 15 which is triangular in cross section. When the parts 1 and 2 of the mould are together the lips 15 define a horizontal annular ledge 16 having a vertical rear face 17 in the upper part of the side walls of the plates 4 and 5.

The apparatus also comprises a last 18 which is shown carrying the upper of a sandal formed by straps 19 attached to an insole 20 of such a size that the projecting edge 20a of the insole can rest on the ledge 16 and abut the vertical face 17.

The last 18 is provided with a number of hooked pins 21 for retaining the projecting edge 20a of the insole in a precise position after it has been mounted on the last and until it is located on the ledge 16 as the last is positioned onto the mould.

To avoid the pin 21 interfering with the closing of the mould there are provided a number of recesses 24 in the edge of the half-frames 8, 9 in positions corresponding to the position of the pins 21 on the last, and the plates 4 and 5 are provided with corresponding seats to receive the hooked ends 22 of the pins 21.

The apparatus also comprises means for supporting the last and means for closing the half-frames 8 and 9 on to the plates 4 and 5, so as to lock the projecting edge of the insole firmly in position on the ledge 16 formed by the lips 15 of the plates 4 and 5. The chamber 3 of the mould is thereby sealed.

The means for supporting the last 18 comprise a beam 25 to which the last 18 is attached and the means for closing the half-frames 8, 9 comprise a pair of columns 26 at each end of the beam 25 which project downwardly toward the half-frames 8 and 9. The lower end of each column 26 has a screw threaded portion 27 onto which hemispherical nuts 28 are screwed to four adjustable feet. The length of the columns 26 is such that as the beam 25 is lowered toward the parts 1 and 2 of the mould, the half-frames 8 and 9 are closed by the adjustable feet 28 and held firmly closed when the last is in position with the insole resting on the shelf 16, with the adjustable feet 30 located in recesses 29 in the half-frames 8 and 9.

The chamber 3 of the mould is closed underneath by a base element 30 which forms the base of the mould and against which the parts 1 and 2 of the mould fit to form the chamber 3. The position of the base element 30 can be controlled in any known way to vary the thickness of sole produced by the mould 1.

The movement of the base element 30 cannot only be used to vary the thickness of the sole but also to exercise pressure on the material from which the sole is being made during the moulding of the sole to assist its welding to the upper and to the insole in the mould.

The finished sole 31 shown in FIG. 6 can be produced in the known way, by vulcanization within the chamber 3 of the mould of a charge of raw rubber, or of a mixture able to produce spongy rubber, or by injecting into the chamber 3 a charge of a synthetic resin of suitable quality.

Depending on the process to be used the mould can further comprise heating or cooling means as required to allow the process of moulding and consolidation of the sole to be appropriately controlled.

Naturally still keeping to the principle of the invention its details can be varied from what has been described and illustrated as an example, without departing from the scope of the invention as defined in the following claim.

1. An apparatus for manufacturing shoes have molded soles of the type having projecting edges comprising a mold having a molding chamber, said molding chamber having sidewalls, said sidewalls having a ledge formed thereon, a last for receiving and supporting an upper and an insole for said shoe, the edge portion of at least one of which to form, at least in part, said projecting edge portion of said sole, said molding chamber being closable by the super-imposition of said last with said upper and said insole over said molding chamber such that said edge portion rests on said ledge, clamping means for clamping said edge portion to said ledge, and a plurality of hooked pins on said last for locating said edge portion of said insole before said insole is positioned on said ledge, said clamping means having a plurality of recesses along the edge thereof complementary to said hooked pins to provide clearance for said pins when said clamping means is disposed in engagement with said edge portion.

References Cited
UNITED STATES PATENTS 3,523,333 8/1970 Taylor et al. _____ 18—30 US X
3,535,418 10/1970 Daum et al. _____ 18—30 US X H. A. KILBY, Jr., Primary Examiner U.S. Cl. X.R.

425—129, 242; 12—4.1